United States Patent
Ayukawa et al.

(10) Patent No.: US 11,569,697 B2
(45) Date of Patent: Jan. 31, 2023

(54) ROTARY ELECTRIC MACHINE

(71) Applicant: Mitsubishi Electric Corporation, Tokyo (JP)

(72) Inventors: Naohiko Ayukawa, Tokyo (JP); Tatsuro Hino, Tokyo (JP); Kohei Egashira, Tokyo (JP); Kazuya Hasegawa, Tokyo (JP); Yasuhiro Hayasaka, Tokyo (JP); Kenji Maekawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 291 days.

(21) Appl. No.: 17/073,502

(22) Filed: Oct. 19, 2020

(65) Prior Publication Data

US 2021/0175758 A1 Jun. 10, 2021

(30) Foreign Application Priority Data

Dec. 4, 2019 (JP) .............................. JP2019-219491

(51) Int. Cl.
*H02K 3/18* (2006.01)
*H02K 1/14* (2006.01)
*H02K 1/16* (2006.01)
*H02K 3/52* (2006.01)

(52) U.S. Cl.
CPC ............ *H02K 1/145* (2013.01); *H02K 1/165* (2013.01); *H02K 3/525* (2013.01)

(58) Field of Classification Search
CPC .......... H02K 3/18; H02K 3/522; H02K 3/525; H02K 1/165
See application file for complete search history.

(56) References Cited

U.S. PATENT DOCUMENTS

| | | | | |
|---|---|---|---|---|
| 6,388,357 | B1* | 5/2002 | Tokumasu | H02K 3/28 310/198 |
| 9,871,417 | B2* | 1/2018 | Saito | H02K 29/03 |
| 10,666,104 | B2* | 5/2020 | Koga | H02K 3/48 |
| 2005/0206263 | A1* | 9/2005 | Cai | H02K 3/12 310/201 |
| 2013/0154428 | A1* | 6/2013 | Sakuma | H02K 3/28 310/207 |

FOREIGN PATENT DOCUMENTS

JP 2012-016195 A 1/2012

* cited by examiner

*Primary Examiner* — Dang D Le
(74) *Attorney, Agent, or Firm* — Sughrue Mion, PLLC; Richard C. Turner

(57) ABSTRACT

An annular stator core in which, out of slots arrayed in a circumferential direction and extending in a radial direction, q slots are formed per pole and per phase; and stator windings, for respective phases, attached to the stator core. For each stator winding, q*n unit coils obtained by winding wire conductors at regular intervals into concentric winding forms are used to obtain n coils in each of which the q unit coils wound in a same direction are connected so as to be shifted from each other in the circumferential direction, and the stator winding is composed of two coil groups each obtained by joining the n/2 coils together. The two coil groups are connected in parallel to each other between power feed portions and neutral points, and two coils that are connected to the power feed portions are disposed so as to share the slot.

4 Claims, 18 Drawing Sheets

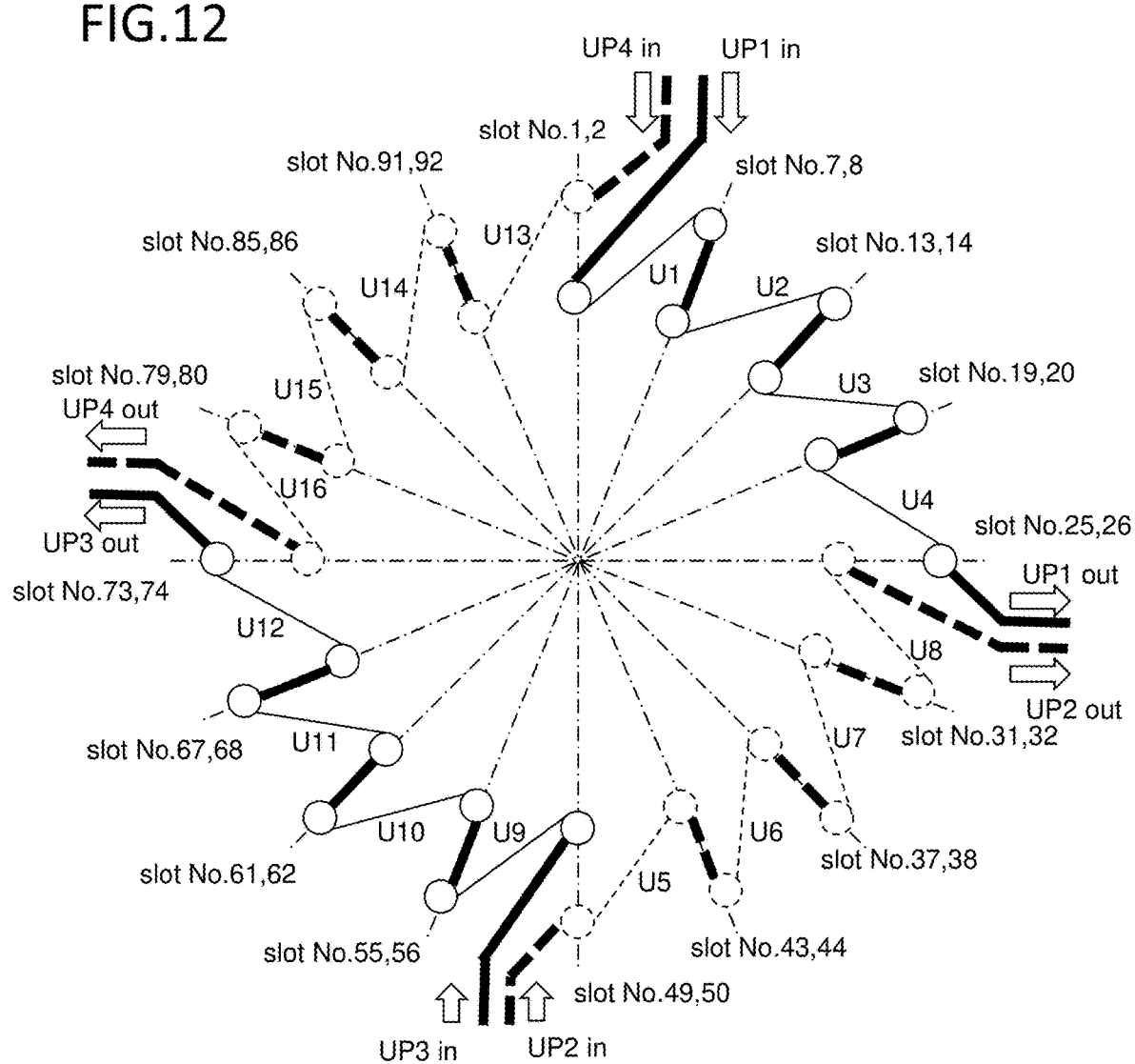

ROTARY ELECTRIC MACHINE

BACKGROUND OF THE INVENTION

1. Field of the Invention

The present disclosure relates to a rotary electric machine.

2. Description of the Background Art

Rotary electric machines used for electric motors and power generators are required to have smaller sizes and higher outputs.

In order to increase the output of a rotary electric machine, high voltage needs to be applied to coils formed by winding wire conductors around a stator core composing the rotary electric machine. Thus, the rotary electric machine needs to include an insulating material having a thickness sufficient for enduring a great potential difference generated between the coils.

However, if the insulating material is made thicker without changing the size of a region in which the coils are disposed, the wire conductors forming the coils need to be made thinner, and current is restricted, resulting in decrease in the output efficiency of the rotary electric machine.

Meanwhile, if the insulating material is made thicker without changing the thicknesses of the wire conductors forming the coils, the diameter of the region in which the coils are disposed is increased, resulting in increase in the size of the rotary electric machine.

In view of this, the following configuration is disclosed: a configuration in which a plurality of coils are sequentially connected to each other and disposed for two turns in the circumferential direction of a stator core so that the potential difference between the coils per turn is reduced to half an in-phase potential difference (Patent Document 1).

Patent Document 1: Japanese Laid-Open Patent Publication No. 2012-16195

The rotary electric machine disclosed in Patent Document 1 allows the potential difference between the coils to be reduced to half the in-phase potential difference. However, if further greater enhancement is required for reducing the size and increasing the output of the rotary electric machine, reduction to half the in-phase potential difference is insufficient as the reduction in the potential difference between the coils. Accordingly, a problem arises in that enhancement of efficiency and reduction in the size of the rotary electric machine cannot be sufficiently achieved.

SUMMARY OF THE INVENTION

The present disclosure has been made to solve the above-described problems, and an object of the present disclosure is to obtain a rotary electric machine having a small size and high output, with a reduced in-phase potential difference between coils disposed on a stator core of the rotary electric machine.

A rotary electric machine according to the present disclosure is a rotary electric machine including: an annular stator core in which, out of slots arrayed in a circumferential direction and extending in a radial direction, q ("q" represents a natural number not less than 2) slots are formed per pole and per phase; and stator windings, for respective phases, attached to the stator core. For each stator winding, q*n ("n" represents an even number not less than 4) unit coils obtained by winding wire conductors at regular intervals into concentric winding forms are used to obtain n coils in each of which the q unit coils wound in a same direction are connected so as to be shifted from each other in the circumferential direction, and the stator winding is composed of two coil groups each obtained by joining the n/2 coils together. The coils composing the coil groups are arrayed so as to circle the slots of the annular stator core, and the coils adjacent to each other in the circumferential direction are joined together so as to share the slots. The two coil groups are connected in parallel to each other between power feed portions and neutral points, and two coils that are connected to the power feed portions among the coils composing the two coil groups are disposed so as to share the slot.

The rotary electric machine according to the present disclosure makes it possible to obtain a rotary electric machine that has a small size and high output, while allowing significant reduction in an in-phase potential difference between the coils disposed on the stator core.

BRIEF DESCRIPTION OF THE DRAWINGS

FIG. 12 illustrates arrangement of the coils on the stator core according to a third embodiment;

DETAILED DESCRIPTION OF THE PREFERRED

Embodiments of the Invention

Figure 1:
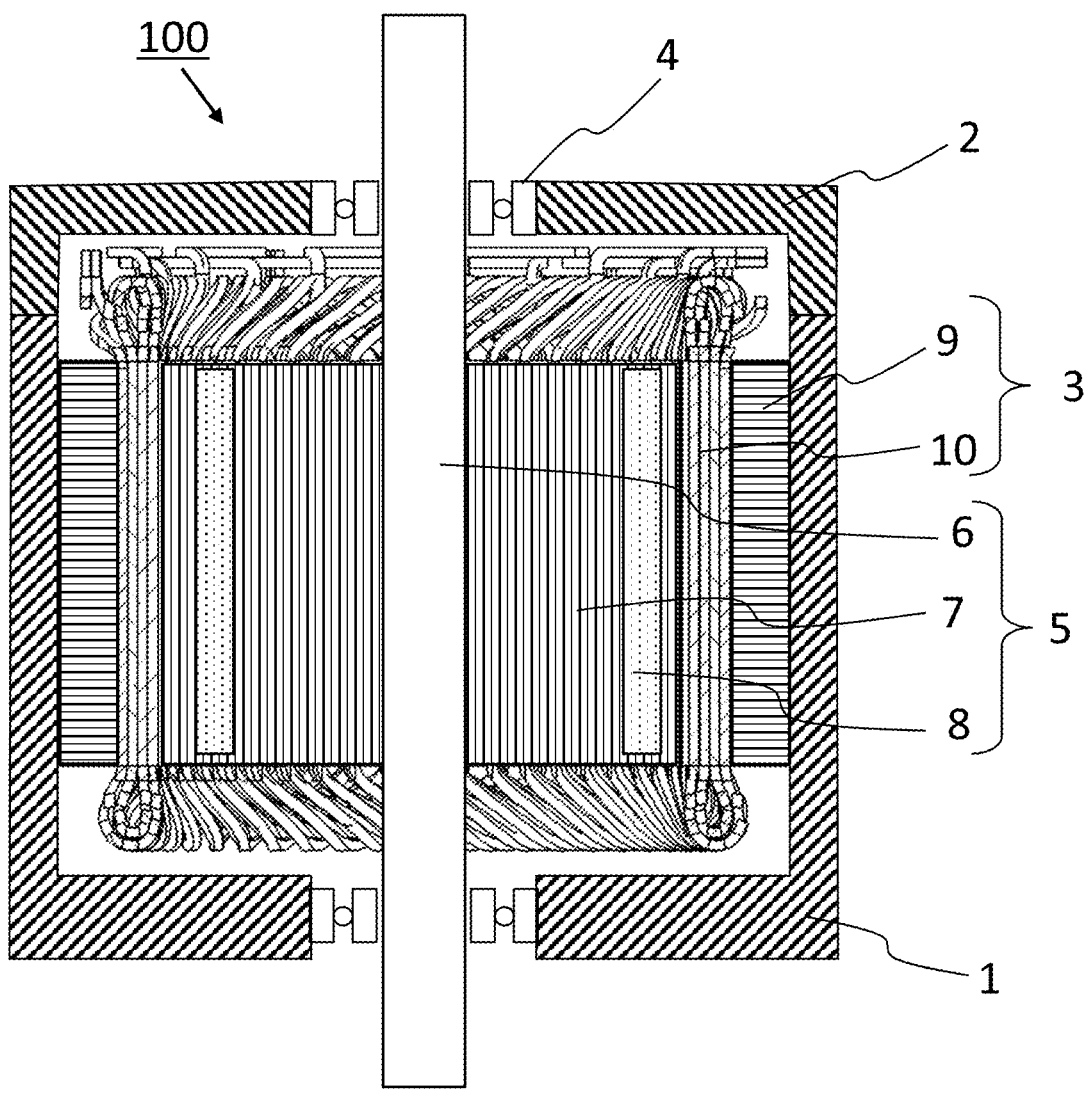
FIG. 1 is a cross-sectional view of a rotary electric machine according to a first embodiment.

In the description of the embodiments and the drawings, parts denoted by the same reference characters indicate identical or corresponding parts.

First Embodiment

A rotary electric machine of a first embodiment will be described with reference to FIG. 1 to FIG. 10.

First, a schematic configuration of the rotary electric machine will be described with reference to FIG. 1, FIG. 2A, and FIG. 2B. The shape of each of coils forming stator windings and a method for winding the coil will be described with reference to FIG. 3A to FIG. 4.

Next, the structure of a stator in which these coils are used will be described with reference to FIG. 5 to FIG. 8, and the arrangement of the coils characteristic of the present first embodiment will be described with reference to FIG. 9 and FIG. 10.

<Schematic Configuration of Rotary Electric Machine>

FIG. 1 is a cross-sectional view of a rotary electric machine 100.

The outer circumference of the rotary electric machine 100 is covered by: a housing 1 having a cylindrical shape with a bottom; and a bracket 2 closing an opening of the housing 1. A stator 3 fixed by shrinkage fitting, press fitting, or the like is disposed in the housing 1, and a rotor 5 is disposed at the center of the stator 3.

The stator 3 is formed by: a stator core 9; and stator windings 10 composed of a plurality of coils 12 disposed on the stator core 9.

The rotor 5 is formed by: a rotation shaft 6 rotatably supported by bearings 4 attached to the bracket 2 and the bottom of the housing 1; a rotor core 7 fastened to the rotation shaft 6; and a plurality of permanent magnets 8 embedded at regular intervals in the circumferential direction of the outer circumferential surface of the rotor core 7. The rotor 5 functions as a permanent magnet rotor.

In this description, the extending direction of the rotation shaft 6 is referred to as an axial direction, the radial direction from the rotation shaft 6 is referred to as a radial direction, and the rotation direction about the rotation shaft 6 is referred to as a circumferential direction, for explanation.

Figure 2A:
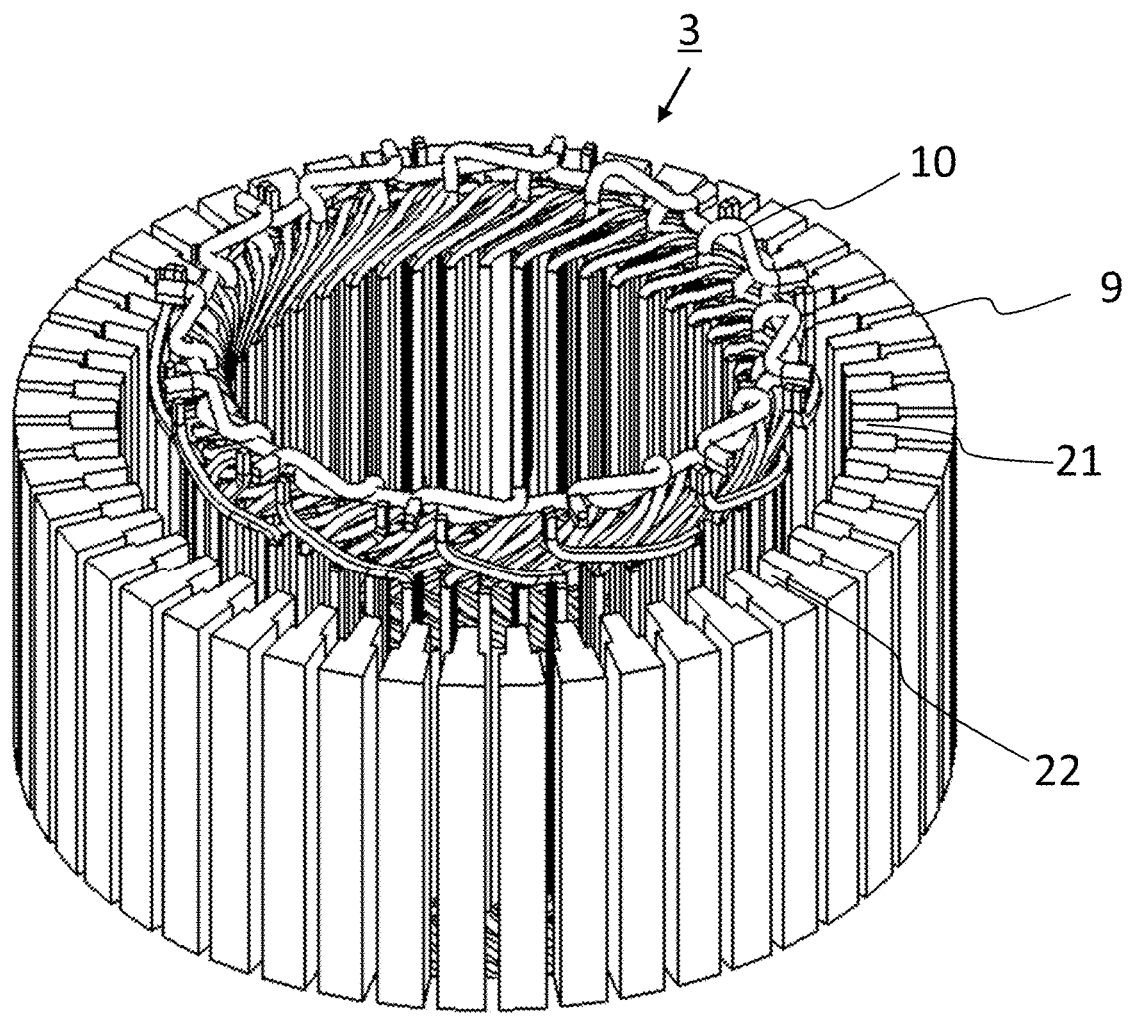
FIG. 2A is a perspective view of a stator according to the first embodiment.
Figure 2B:
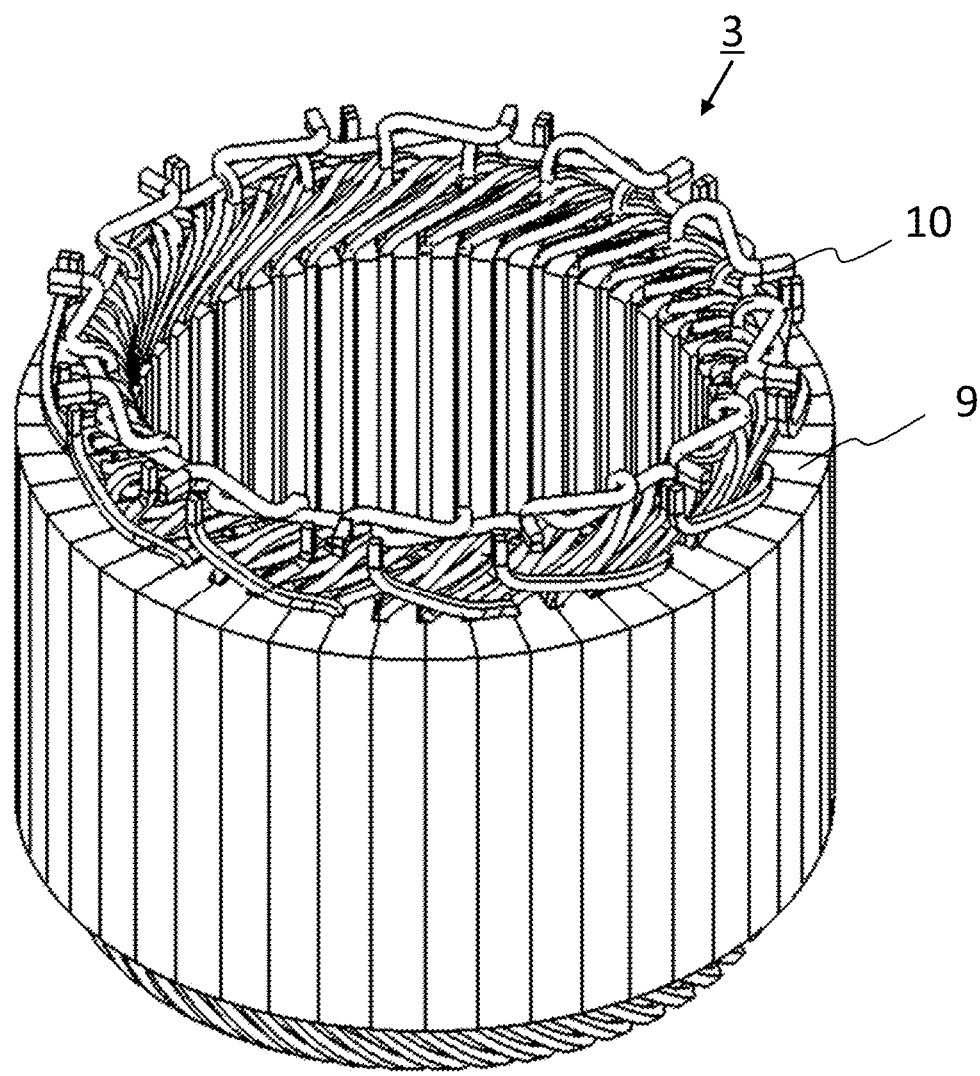
FIG. 2B is a perspective view of the stator according to the first embodiment.

FIG. 2A and FIG. 2B are each a perspective view of the stator 3 composed of: the stator windings 10 formed by arranging the plurality of coils 12; and the stator core 9. FIG. 2A illustrates a state where the stator core 9 is divided in the circumferential direction and has not yet been assembled. FIG. 2B illustrates a state where the stator core 9 has been assembled and is in an integrated form.

As shown in FIG. 2A, the divided stator core 9 has teeth 21 projecting in the radial direction. A space between every two adjacent teeth 21 is called a slot 22. When the divided stator core 9 is assembled, the teeth 21 are inserted into the centers of the coils 12 composing the stator windings 10.

As shown in FIG. 2B, if the divided stator core 9 is integrally assembled, the plurality of coils 12 composing the stator windings 10 are partially held between the teeth 21 and accommodated in the slots 22.

Here, the following case will be described as an example of the stator 3: a case where the number of magnetic poles is 8, the number of the slots 22 formed in the stator core 9 and having the coils 12 disposed in the slots 22 is 48, and the stator windings 10 are three-phase windings. In this example, two slots 22 are formed per pole and per phase.

The shape of each of the coils 12 composing the stator windings 10, a method for winding the coil 12, and the like will be described below.

<Shape of Coil>

The coils 12 are formed by processing wire conductors which are each a metal material having an insulating coating formed thereon.

Figure 3A:
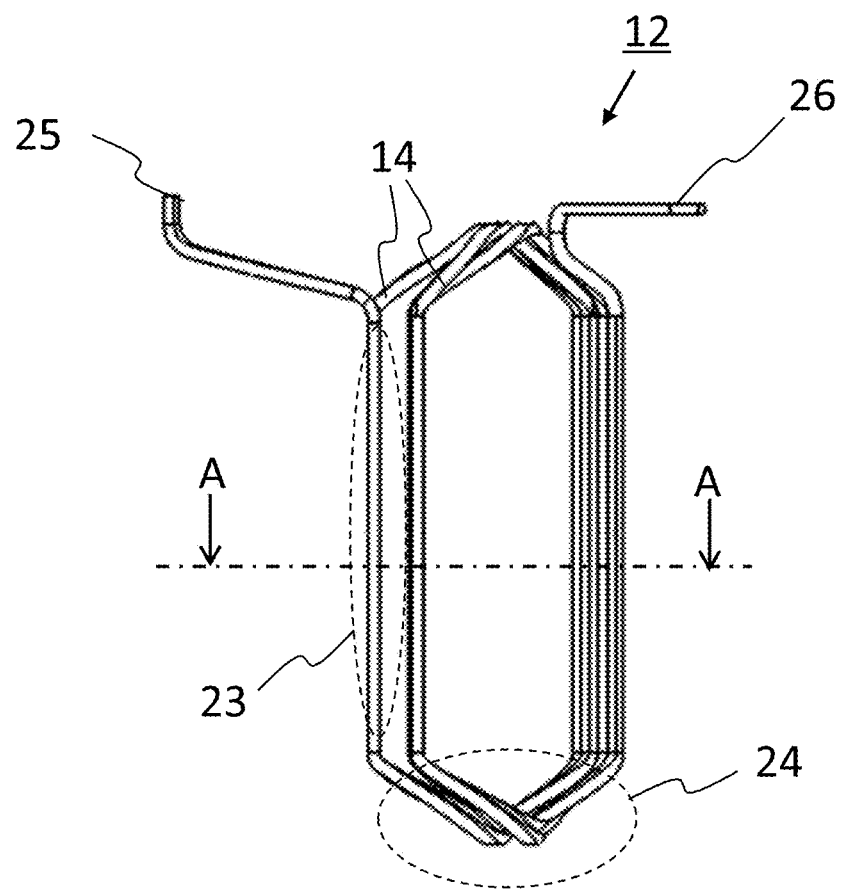
FIG. 3A is a perspective view of a coil according to the first embodiment.
Figure 3B:
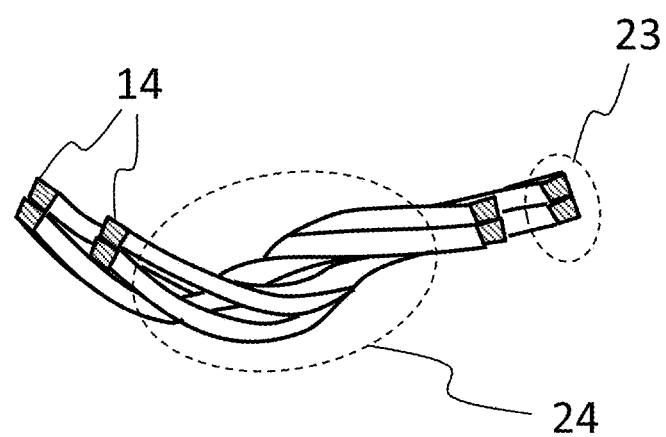
FIG. 3B is an A-A cross-sectional view of the coil according to the first embodiment.

FIG. 3A is a perspective view of each of the coils 12 composing the stator windings 10. Each stator winding 10 is formed by: joining a plurality of the coils 12 together to form a coil group 13; and further, using a plurality of the coil groups 13. FIG. 3B shows an A-A cross section of the coil 12 shown in FIG. 3A.

As shown in FIG. 3A, the coil 12 has a configuration in which two hexagonal wire conductors are disposed so as to be shifted from each other. Each wire conductor formed in a hexagonal shape is referred to as a unit coil 14, and the unit coil 14 is obtained by forming the wire conductor into an annular concentric winding form.

FIG. 3A shows a coil 12 formed from two unit coils 14. A portion, of each unit coil 14, that is enclosed by a broken line in the vertical direction, is inserted into a corresponding slot 22 at the time of disposition on the stator core 9 and is referred to as an insertion portion 23 of the unit coil 14. A portion, of the unit coil 14, that is enclosed by a broken line in the horizontal direction and that connects one insertion portion 23 and an insertion portion 23 located in an opposing manner on the opposite side of the unit coil 14 to each other, is referred to as a turned portion 24. When the unit coil 14 is disposed on the stator core 9, the turned portion 24 projects in the axial direction from slots 22, passes through the outer surface of the stator core 9, and is connected to the opposing insertion portion 23.

A terminal portion for supplying current to the coil 12 formed by the two unit coils 14 is referred to as an outer circumferential-side terminal 25. Meanwhile, a terminal portion for supplying current from the coil 12 to an adjacent next coil 12 is referred to as an inner circumferential-side terminal 26.

In the cross-sectional view in FIG. 3B, cross sections of the insertion portions 23 of the unit coils 14, and the turned portions 24 connecting the insertion portions 23 to each other, are shown. In the present first embodiment, the insertion portions 23 of each unit coil 14 are formed by two wire conductors. That is, the unit coil 14 used herein has a double hexagonal shape formed by the wire conductors having concentric winding forms, and the two unit coils 14 having double hexagonal shapes and formed by the wire conductors are disposed so as to be shifted from each other, thereby composing the coil 12.

The wire conductors forming the unit coil 14 are not limited to the double wire conductors, and the unit coil 14 may be formed by triple or more wire conductors.

<Method for Winding Coil>

Figure 4:
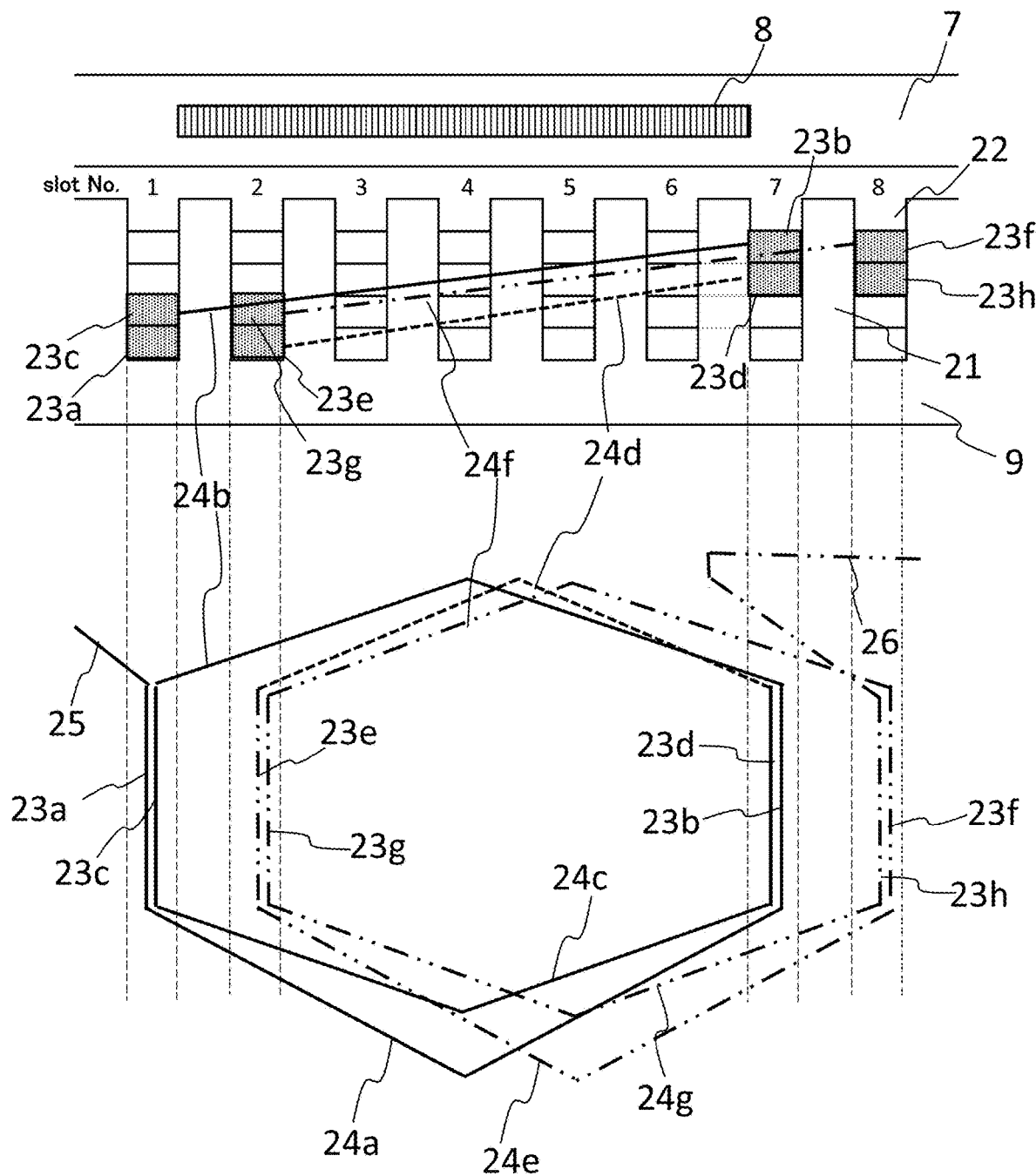
FIG. 4 is a diagram for explaining a method for winding the coil according to the first embodiment.

FIG. 4 is a diagram for explaining a method for winding the coil 12. The upper side of FIG. 4 is a schematic diagram in which teeth 21 and slots 22 arranged so as to be curved in the circumferential direction at a portion of the stator core 9 observed from above in the axial direction are linearly drawn for simplification of description. In FIG. 4, numbers which are slot Nos. 1 to 8 are assigned to the slots 22, and four quadrangles are drawn in each slot 22 to indicate that four of the insertion portions 23 of the coils 12 can be disposed in each slot 22.

The lower side of FIG. 4 shows a coil 12 formed by winding wire conductors through corresponding teeth 21 and slots 22 of the stator core 9. As illustrated in FIG. 3A, in the present first embodiment, the order of winding in which the unit coils 14 formed in hexagonal shapes by the double wire conductors overlap so as to be shifted by one slot 22 from each other in the circumferential direction to form the coil 12, is indicated, and an insertion portion 23a to an insertion portion 23h are drawn according to the order of winding.

On the upper side and the lower side in FIG. 4, the drawing is made such that left positions match each other and right positions match each other. For example, two insertion portions 23a and 23c, of the coil 12 drawn on the lower side, that are located at the left end are disposed in slot No. 1 on the upper side, and two insertion portions 23f and 23h, of the coil 12, that are located at the right end are disposed in slot No. 8.

On the upper side of FIG. 4, eight slots 22 with slot Nos. 1 to 8 are shown as described above.

Eight insertion portions 23a to 23h of the coil 12 drawn on the lower side of FIG. 4 are disposed at hatched quadrangles among the quadrangles drawn in the slots 22. A solid line, a broken line, and a two-dot dashed line which are diagonally drawn so as to overlap with the stator core 9 on the upper side, indicate turned portions 24a to 24g connecting the insertion portions 23 to each other. For example, the turned portion 24b drawn with the solid line indicates that the insertion portion 23b and the insertion portion 23c are connected to each other.

The order of forming the coil 12 drawn in FIG. 4 will be described in detail below.

First, the wire conductor starts to be wound from the outer circumferential-side terminal 25. In slot No. 1, the wire conductor is wound in the depth direction of the drawing sheet on the upper side of FIG. 4 or wound downward from above on the lower side of FIG. 4, to form the insertion portion 23a.

Hereinafter, the winding directions will be described based on the directions on the lower side of FIG. 4.

Next, the turned portion 24a extending via the lower surface of the stator core 9 so as to connect the insertion portion 23a and the insertion portion 23b to each other, is formed.

Then, the wire conductor is wound upward through slot No. 7 to form the insertion portion 23b, and the turned portion 24b is formed on the upper surface of the stator core 9 so as to connect the insertion portion 23b and the insertion portion 23c to each other.

Hereinafter, the insertion portion 23c, the turned portion 24c, the insertion portion 23d, the turned portion 24d, the insertion portion 23e, the turned portion 24e, the insertion portion 23f, the turned portion 24f, the insertion portion 23g, the turned portion 24g, and the insertion portion 23h are formed in this order. Lastly, connection to the inner circumferential-side terminal 26 is made.

By following the above-described order of winding, one unit coil 14 composed of the insertion portions 23a to 23d and the other unit coil 14 composed of the insertion portions 23e to 23h are formed, and the turned portions 24a to 24h connecting the insertion portions 23 to each other in the circumferential direction are also formed together therewith.

The coils 12 each formed by the two unit coils 14 positionally shifted by one slot 22 from each other in the circumferential direction are disposed in two slots 22 of the stator core 9 per pole and per phase.

Each of the outer circumferential-side terminal 25 and the inner circumferential-side terminal 26 functions as a connection between adjacent coils 12 or a power feed portion for supplying power by being connected to an inverter.

<Structure of Stator>

Figure 5:
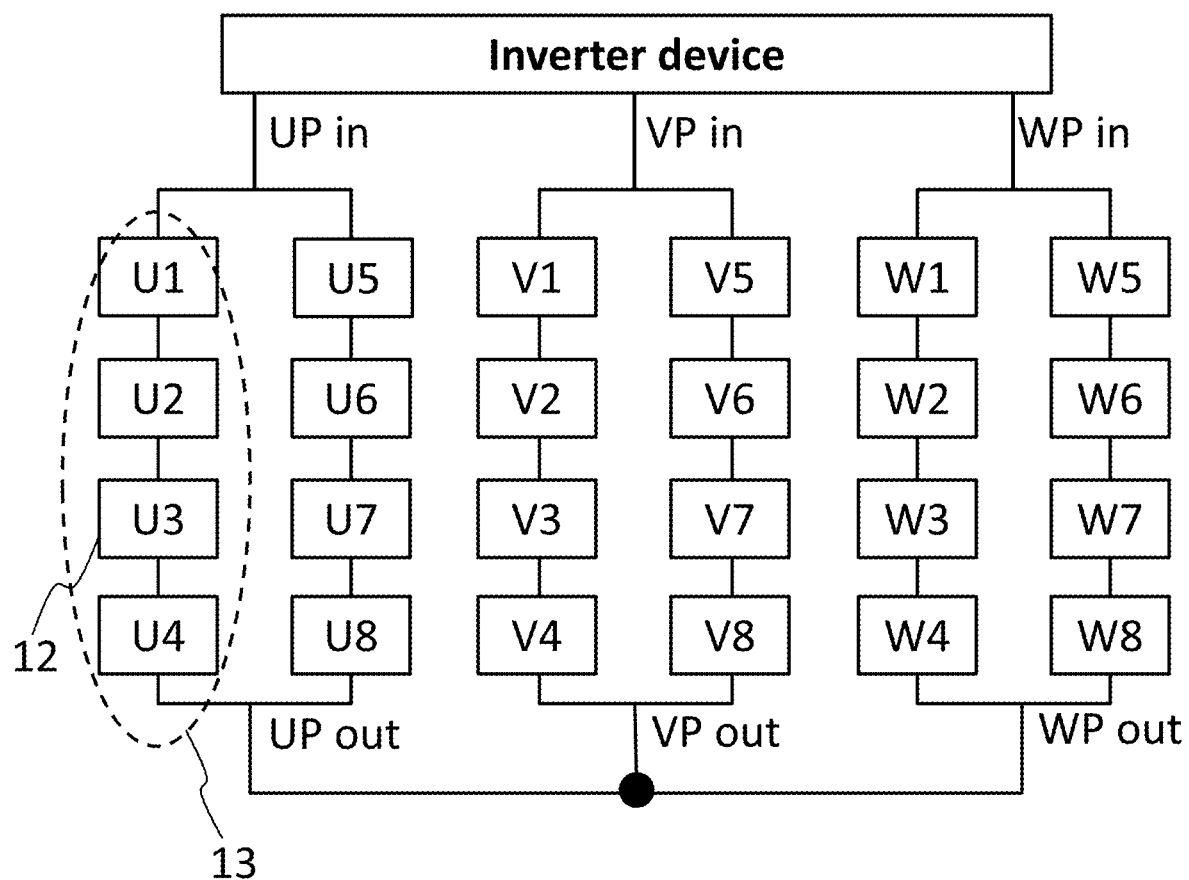
FIG. 5 is a wire diagram of coils composing stator windings according to the first embodiment.

FIG. 5 shows an example of a wire diagram of the coils 12 composing the stator.

Three-phase currents for U phase, V phase, and W phase are outputted from an inverter device. U1 to U8, V1 to V8, and W1 to W8 represent respective phases of coils 12 and form coil groups 13 corresponding to the three phases.

"UP in", "VP in", and "WP in" represent inputs from the inverter device to the respective coil groups 13. "UP out", "VP out", and "WP out" represent outputs from the respective coil groups 13.

Of the coil group 13 composed of U1 to U8 in the U phase, a coil group 13 composed of U1 to U4 and a coil group 13 composed of U5 to U8 are connected in parallel to each other from a power feed portion of the inverter device to a neutral point, and the eight coils 12 composing the two coil groups 13 are arranged so as to circle the stator core 9. Also in each of the V phase with the coils 12 of V1 to V8 and the W phase with the coils 12 of W1 to W8, coil groups 13 are connected in parallel to each other from a power feed portion of the inverter device to a neutral point.

The connection configuration between the coils 12 composing the coil groups 13 will be described with reference to FIGS. 6 and 7.

Figure 6:
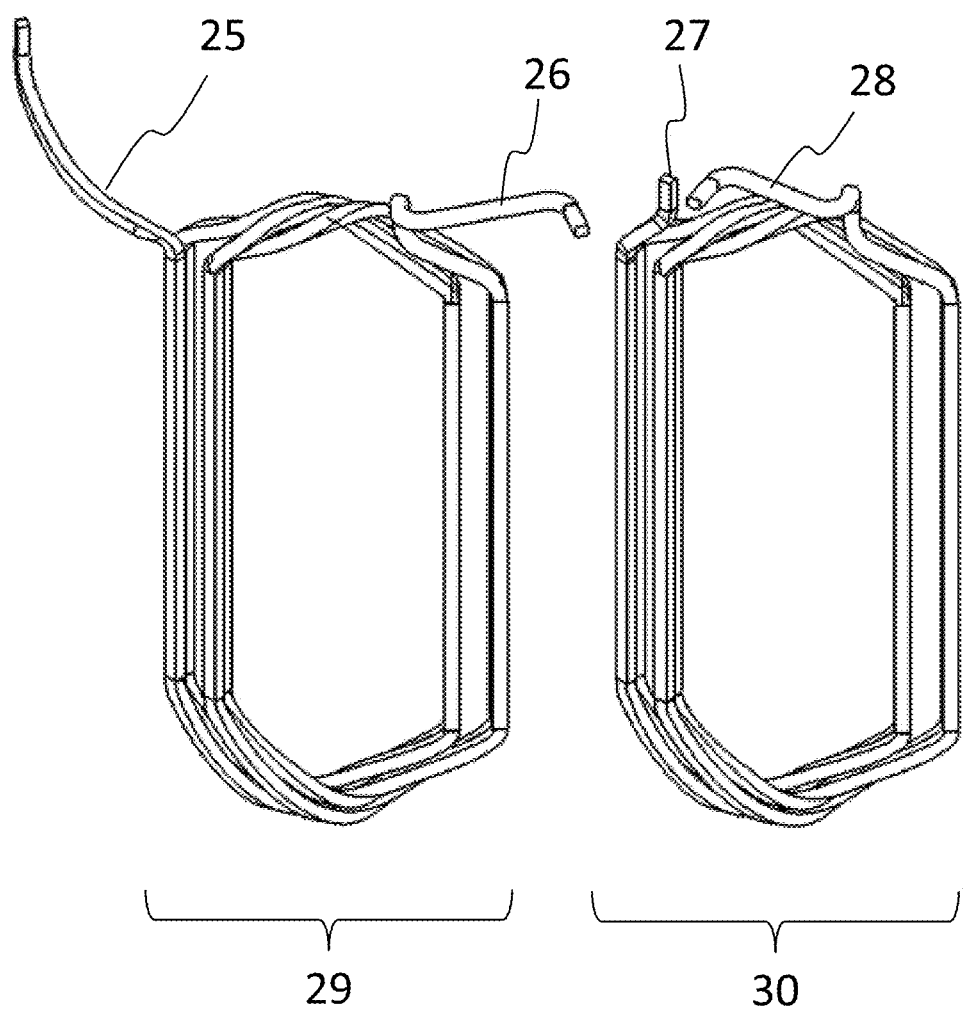
FIG. 6 is a perspective view of coils according to the first embodiment.

The coils 12 have two types, i.e., coils A 29 as shown on the left side of FIG. 6 and coils B 30 as shown on the right side of FIG. 6. As shown also in FIG. 3A, in each coil A 29, the outer circumferential-side terminal 25 and the inner circumferential-side terminal 26 are formed so as to project outward. In each coil B 30, an outer circumferential-side terminal 27 and an inner circumferential-side terminal 28 are formed so as to be oriented inward.

Figure 7:
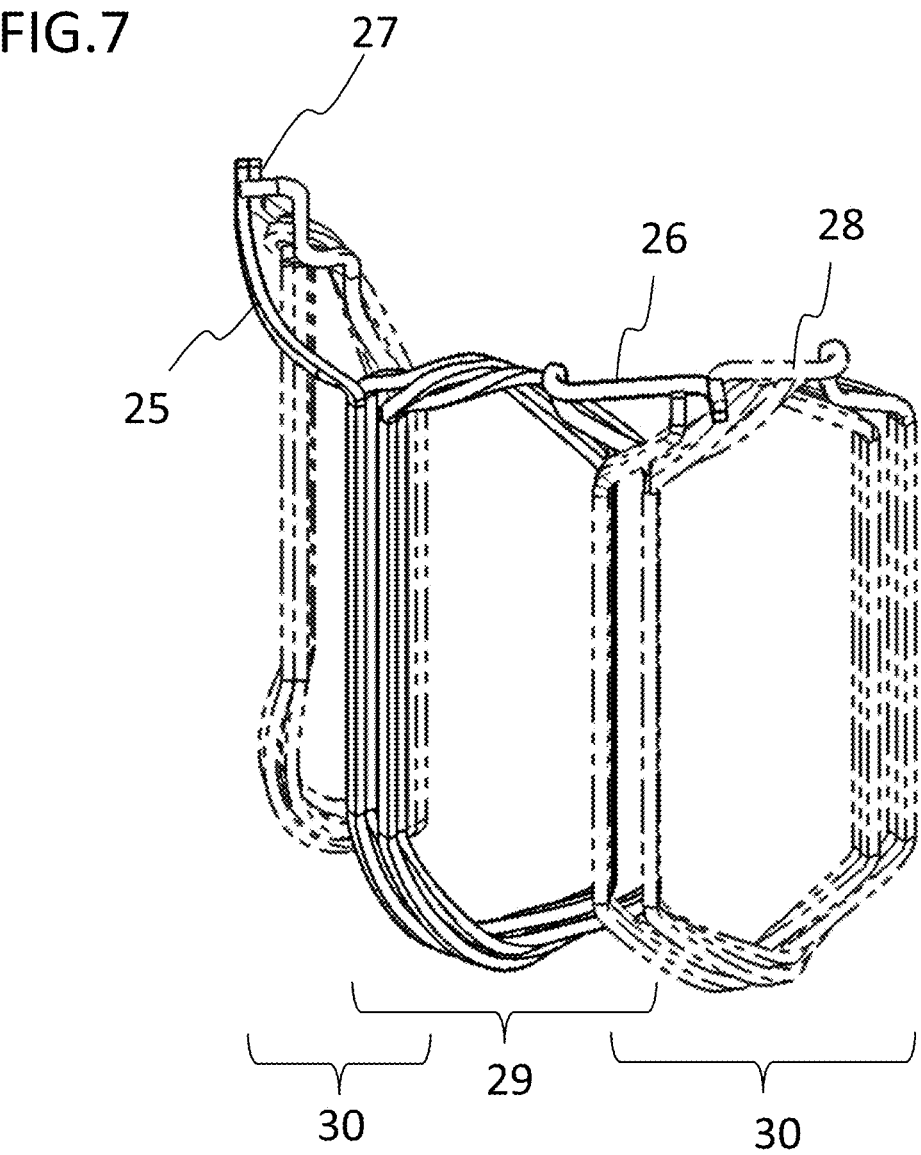
FIG. 7 is a diagram for explaining a connection configuration between the coils according to the first embodiment.

As shown in FIG. 7, the coil A 29 and the coils B 30 are alternately arranged. The outer circumferential-side terminal 25 and the inner circumferential-side terminal 26 of the coil A 29 located at the center of FIG. 7 are respectively connected to the outer circumferential-side terminal 27 of the coil B 30 located on the left side and the inner circumferential-side terminal 28 of the coil B located on the right side.

Figure 8:
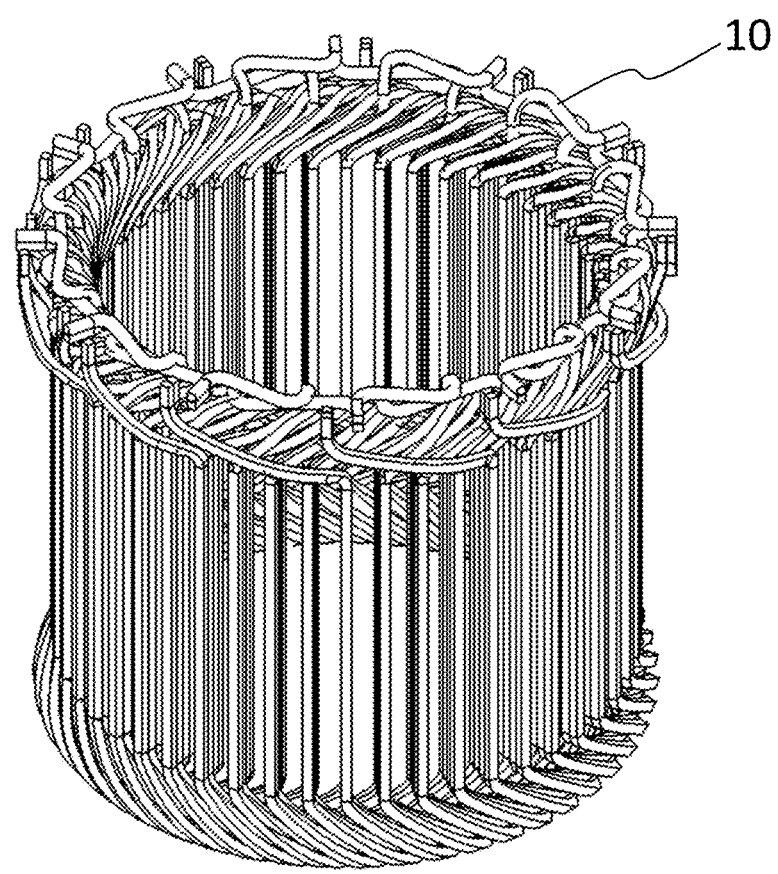
FIG. 8 is a diagram for explaining the connection configuration between the coils according to the first embodiment.

In this manner, the coil group 13 obtained by connecting the plurality of coils 12 is formed for each of the U phase, the V phase, and the W phase. Eight coils 12 are disposed and connected per phase so as to circle the stator core 9. Thus, as shown in FIG. 8, the stator windings 10 are formed by twenty-four coils 12 for the three phases.

As shown in FIG. 2A, the teeth 21 of the divided stator core 9 are inserted into gaps at the centers of the coils 12 from outside the periphery of the coils 12, whereby the stator 3 is formed.

In the present first embodiment, the stator core 9 with a divisible configuration has been described as an example. However, a stator core 9 having no division surfaces in the circumferential direction can also be used. In this case, the coils 12 are inserted in the radial direction from the inner side of the stator core 9, whereby the stator 3 can be formed.

<Connection Configuration and Arrangement of Coils>

Figure 9:
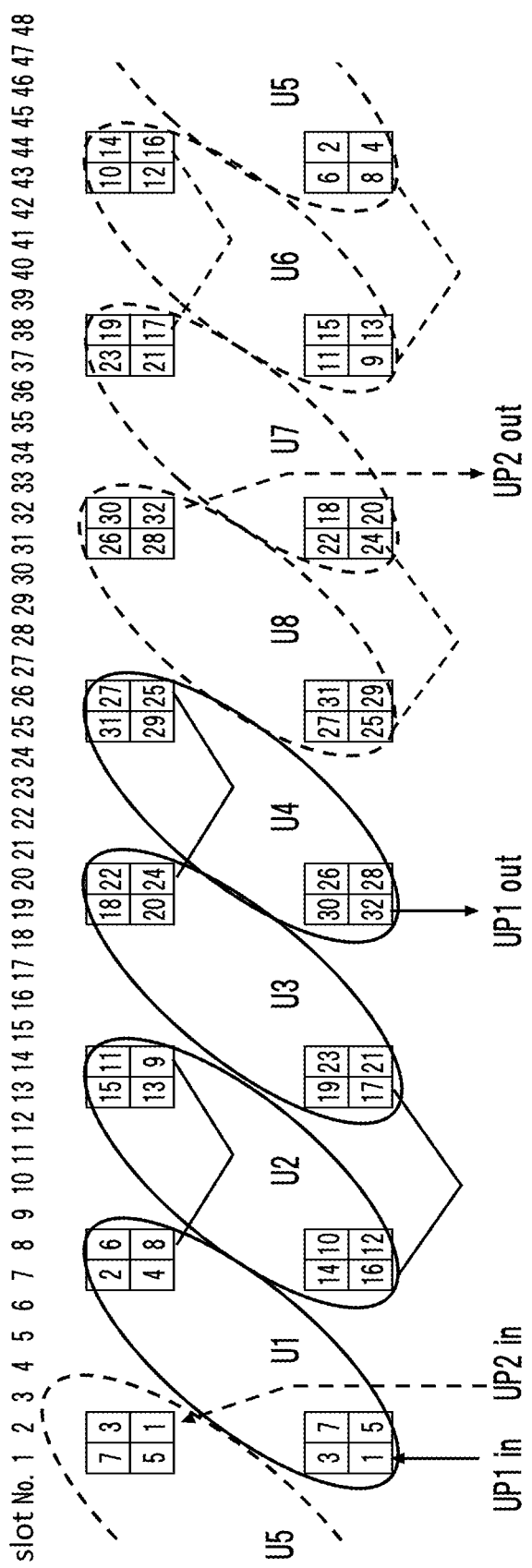
FIG. 9 is a diagram for explaining the connection configuration between the coils according to the first embodiment.

FIG. 9 illustrates the connection configuration between the coils 12 forming the stator winding 10 for the U phase. Regarding the slot Nos. shown in the upper part of FIG. 9, all the slots 22 formed between the teeth 21 of the stator core 9 and arrayed in an annular pattern are, for simplification of description, assigned with No. 1 to 48 and linearly drawn.

Therefore, the right end and the left end in this connection configuration shown in FIG. 9 are continuously arranged so as to form an annular pattern in the actual stator core 9.

In FIG. 9, the numbers written in the quadrangles indicate the order of a process of winding the wire conductors to form the coils 12 composing the stator winding 10.

Four numbers arranged in the vertical direction under each slot No., indicate that four of the insertion portions 23 of the coils 12 are disposed in the same slot 22 and that wire conductors are wound four times in the same slot 22. In FIG. 9, the turned portion 24 connecting each insertion portion 23 and the corresponding insertion portion 23 is not shown.

"UP1 in" to "UP1 out" indicated by the solid arrows represent the coil group 13 composed of U1 to U4 enclosed by the solid ellipses. "UP2 in" to "UP2 out" indicated by the broken arrows represent the coil group 13 composed of U5 to U8 enclosed by the broken ellipses. The V-shaped solid lines formed between the respective coils in the coil group 13 composed of U1 to U4 and the V-shaped broken lines formed between the respective coils in the coil group 13 composed of U5 to U8, indicate connection wires between the coils 12.

As illustrated in FIG. 5, in the U phase, the coils 12 composing the two coil groups 13 which are respectively composed of U1 to U4 and U5 to U8 and which are connected in parallel to each other, are arranged so as to circle the stator core 9.

Coils 12 that are adjacent to each other in the circumferential direction such as U1 and U2, and U7 and U8, are electrically connected to each other by the connection wires. Furthermore, as in slot Nos. 7 and 8 for U1 and U2 or as in slot Nos. 31 and 32 for U7 and U8, insertion portions 23 on one side of each of the coils 12 are disposed in common slots 22.

FIG. 9 shows only the coil group 13 for the U phase. Therefore, if the eight slots 22 with slot Nos. 1 to 8 are described as an example, a coil is formed by using, at each end, two slots among the eight slots 22, and thus slot Nos. 3 to 6 are not used.

Also in each of the coil groups 13 for the V phase and the W phase, winding through slots 22 is performed in the same manner so that the coil groups 13 for the three phases are disposed in all the slots 22.

In FIG. 9, the slots 22 in an annular pattern formed in the stator core 9 are linearly drawn, and the procedure of forming the coils 12 and the configurations of the two coil groups 13 respectively composed of U1 to U4 and U5 to U8, have been described. In FIG. 10, the arrangement of the coils 12 will be described with reference to a connection wiring diagram of the coil groups 13 in an annular pattern formed on the stator core 9.

Figure 10:
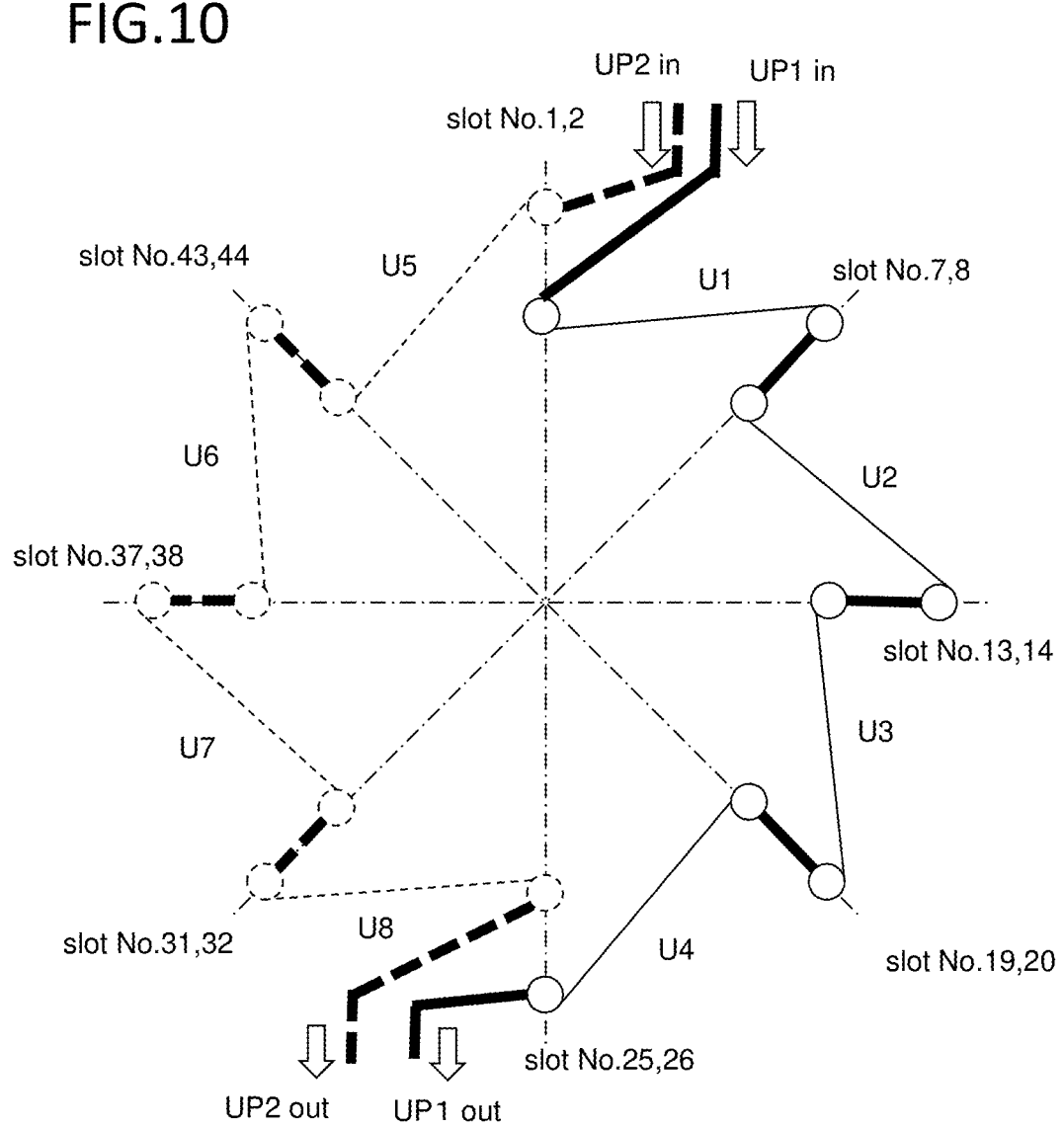
FIG. 10 illustrates arrangement of the coils on a stator core according to the first embodiment.

In the connection wiring diagram in FIG. 10, power feed portions indicated by "UP1 in" and "UP2 in" located at an upper part, and neutral points indicated by "UP1 out" and "UP2 out" located at a lower part, are disposed. U1 to U4 and U5 to U8 respectively composing one coil group 13 and the other coil group 13 which are connected in parallel to each other, are arranged clockwise on the right side of FIG. 10 and anticlockwise on the left side of FIG. 10, respectively.

Specifically, the coil 12 of U1 is wound between slot No. 1, 2 and slot No. 7, 8. Furthermore, the coil 12 of U2 is wound between slot No. 7, 8 and slot No. 13, 14.

U1 and U2 are connected to each other in slot No. 7, 8, and the insertion portions 23 of each of the coils 12 are disposed in slot No. 7, 8 which are common slots 22.

The other coils 12 are connected and disposed in the same manner. In this drawing, the thin solid lines represent the coil group 13 composed of U1 to U4, the thin broken lines represent the coil group 13 composed of U5 to U8, and the thick solid lines and the thick broken lines represent connection wires between the coils 12.

In the coils 12 of U1 and U5 connected to the power feed portions, insertion portions 23 on one side of each of the coils 12 are disposed in slot No. 1, 2 which are common slots 22. In the coils 12 of U4 and U8 connected to the neutral points, insertion portions 23 on one side of each of the coils 12 are disposed in slot No. 25, 26 which are common slots 22.

Each of these coils 12 is connected to the power feed portion or the neutral point for the two coil groups 13 connected in parallel to each other. Thus, substantially no potential difference is generated between the coils 12 of U1 and U5 connected to the power feed portions and between the coils 12 of U4 and U8 connected to the neutral points.

In slot No. 7, 8, No. 13, 14, No. 19, 20, No. 31, 32, No. 37, 38, and No. 43, 44 between the rest of the coils 12, the insertion portions 23 of the coils 12 that are adjacent and connected to each other in the circumferential direction, are disposed in common slots 22.

The potential difference between the power feed portions and the neutral points is the same as an in-phase potential difference. Thus, with division into four coils 12, each of the potential differences between the coils 12 can be reduced to ¼ of the in-phase potential difference.

In the present first embodiment, each coil 12 is formed by using two unit coils 14. Each phase is composed of eight coils 12. Thus, it can be said that each phase is composed of sixteen unit coils 14.

If the number of the unit coils 14 is represented by 2*n (where "n" represents an even number not less than 4), the number of the coils 12 is "n" since each coil 12 is formed by two unit coils 14. In addition, the one coil group 13 can be expressed as U1 to U(n/2), and the other coil group 13 can be expressed as U(n/2+1) to Un.

The coil group 13 composed of U1 to U(n/2) and the coil group 13 composed of U(n/2+1) to Un are connected in parallel to each other from the power feed portions to the neutral points. The number of the coils 12 composing each coil group 13 is n/2.

If U1 and U(n/2+1) are connected to the power feed portions and the insertion portions 23 on one side of each of the coils are disposed in the common slots 22, each of the potential differences between the coils 12 can be reduced to 1/(n/2)=2/n of the in-phase potential difference between the power feed portions and the neutral points since the in-phase potential difference can be divided by n/2 which is the number of the coils 12 of each coil group 13.

Since each of the potential differences between the coils 12 is reduced to 2/n of the in-phase potential difference, favorable insulating properties can be obtained even in the case of size reduction of the rotary electric machine 100, thereby being able to reduce the size and improve the efficiency of the rotary electric machine 100.

In addition, since the power feed portions connected in parallel from the inverter device are disposed close to each other, the size of a terminal block used for the connection can be reduced, thereby being able to reduce the size of the device.

In a case where the coils 12 for the respective phases are not of an annularly formed concentric winding but are of an unevenly formed wave-winding, even if the coil groups 13 are connected in parallel to each other from the power feed portions to the neutral points, each of the potential differences between the coils disposed in the same slots is approximately equal to the in-phase potential difference, and thus an effect of reducing the potential difference is not obtained. Since the wire conductors are annularly formed and the unit coils 14 are of a concentric winding, the effect of reducing the potential difference is obtained, production can be easily performed, and cost can be reduced.

Since the unit coils 14 composing the coils 12 for each phase have the same shape, the stator windings 10 can be easily produced, and production cost can be reduced.

In addition, since the stator winding 10 for each phase is configured by connecting the coil groups 13 adjacent in the circumferential direction, to each other, jumper wires which are the connection wires for connecting the coil groups 13 to each other can be shortened, and copper loss can be reduced. Accordingly, an effect of improving the efficiency of the rotary electric machine 100 can also be exhibited.

Second Embodiment

A second embodiment will be described focusing on differences from the first embodiment, mainly with reference to FIG. 11.

Figure 11:
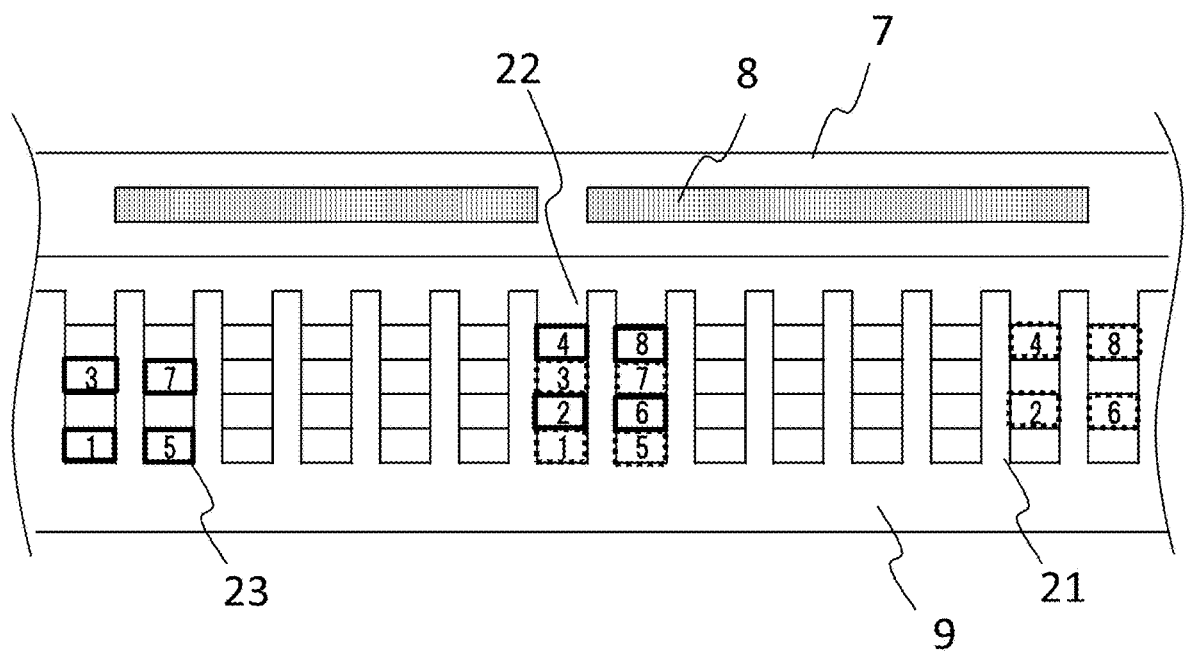
FIG. 11 is a diagram for explaining a connection configuration between the coils according to a second embodiment.

FIG. 11 illustrates a connection configuration between the coils 12 according to the present second embodiment. In this drawing, as in the upper side of FIG. 4 described in the first embodiment, teeth 21 and slots 22 formed so as to be curved in the circumferential direction at a portion of the stator core 9 observed from above in the axial direction are linearly drawn.

In FIG. 11, the numbers 1 to 8 written in the quadrangles indicate the order of winding of the insertion portions 23, of the coils 12 composing the stator windings 10, that are disposed in the slots 22 of the stator core 9.

The characters 1 to 8 written in the thick frames indicate the order of winding of the insertion portions 23 of a first coil 12, and the characters 1 to 8 written in the broken frames indicate the order of winding of the insertion portions 23 of a second coil 12 adjacently connected to the first coil 12.

On the upper side of FIG. 4 in the first embodiment, four insertion portions 23 can be disposed in each slot 22 of the stator core 9, and, in slot Nos. 1 and 2, the insertion portions 23 are disposed at two positions on a radially outer side (lower side in the drawing).

Then, in slot Nos. 7 and 8 shared with the adjacent coil 12, two insertion portions 23 of the same coil 12 are disposed in a radially inner side (upper side in the drawing) in the slots 22.

Meanwhile, the arrangement of the insertion portions 23 in the slots 22 of the stator core 9 illustrated in FIG. 11 in the present second embodiment is characterized in that the insertion portions 23 of the first and second coils 12 are alternately arranged.

If the insertion portions 23 are thus disposed in the slots 22, the intersections between the turned portions 24 passing on the upper surface of the stator core 9 and connecting the insertion portions 23 to each other can be reduced. Accordingly, the turned portions 24 of the stator winding 10 can be formed to be smaller, whereby size reduction of the rotary electric machine 100 can be achieved.

Third Embodiment

A third embodiment will be described focusing on differences from the first embodiment with reference to FIG. 12.

In the first embodiment, as shown in FIG. 10 illustrating the arrangement of the coils 12 on the stator core 9, the number of the slots 22 of the stator core 9 is 48, eight coils 12 for each phase are divided into two coil groups 13, and the two coil groups 13 each composed of four coils 12 are connected in parallel to each other.

The present third embodiment is different from the first embodiment in that the number of the slots 22 of the stator core 9 is 96, sixteen coils 12 for each phase are divided into four coil groups 13, and the four coil groups 13 each composed of four coils 12 are connected in parallel to each other and arranged in an annular pattern on the stator core 9.

The four coil groups 13 for the U phase are each composed of four coils 12. Specifically, the four coil groups 13 are respectively composed of U1 to U4, U5 to U8, U9 to U12, and U13 to U16.

Connection is made in parallel from power feed portions ("UP1 in" and the like) via the four coil groups 13 to neutral points. Each of the coils 12 composing the coil groups 13 is connected to an adjacent coil 12. Insertion portions 23 on one side of each of the coils 12 are disposed in common slots 22.

Slot Nos. 1, 2 and 49, 50 are for the power feed portions. U1 and U13, and U5 and U9, are respectively connected thereto and have the insertion portions 23 disposed in a sharing manner in slot Nos. 1, 2 and 49, 50. Slot Nos. 25, 26 and 73, 74 are for the neutral points. U4 and U8, and U12 and U16, are respectively disposed therein and have the insertion portions 23 disposed in a sharing manner in slot Nos. 25, 26 and 73, 74.

Since the four coil groups 13 are connected in parallel to each other, an in-phase potential difference is generated in each coil group 13. However, since each coil group 13 has four coils 12, each of the potential differences between the coils 12 can be reduced to ¼ of the in-phase potential difference.

In the configuration of the present third embodiment, if the number of the unit coils 14 composing each phase is represented by 4*n, the number of the coils 12 is 2*n since each coil 12 is composed of two unit coils 14. In addition, the four coil groups 13 are expressed as U1 to U(n/2), U(n/2+1) to U(n), U(n+1) to U(3n/2), and U(3n/2+1) to U(2n). Furthermore, insertion portions 23 are disposed and connected in common slots 22, between coils 12 adjacent to each other, e.g., U1 and U2, as described above.

The power feed portions are connected to U1 and U(3n/2+1), and U(n/2+1) and U(n+1), and the insertion portions 23 thereof are disposed in respective common slots 22.

Since the four coil groups 13 are connected in parallel to each other between the power feed portions and the neutral points, an in-phase potential difference is generated in each coil group 13.

Each coil group 13 is composed of n/2 coils 12. Thus, with division by the number of the coils 12, each of the potential differences between the coils 12 can be reduced to $1/(n/2)=2/n$.

As described above, in the present third embodiment, each of the potential differences between the coils 12 can be reduced in the same manner as in the first embodiment.

Furthermore, since the number of the slots 22 of the stator core 9 is increased, cogging torque can be reduced, whereby an effect of reducing vibrations of the rotary electric machine 100 can be obtained.

Fourth Embodiment

A fourth embodiment will be described focusing on differences from the first embodiment with reference to FIG. 13A, FIG. 13B, FIG. 14A, and FIG. 14B.

In the first embodiment, as shown in FIG. 4 and the like, the following configuration has been described. The rotary electric machine 100 is configured such that the number of the magnetic poles is eight and such that the number of the slots 22 arranged for one turn around the stator core 9 is 48, and the stator windings 10 for the respective phases are disposed in two slots per pole and per phase.

Figure 13A:
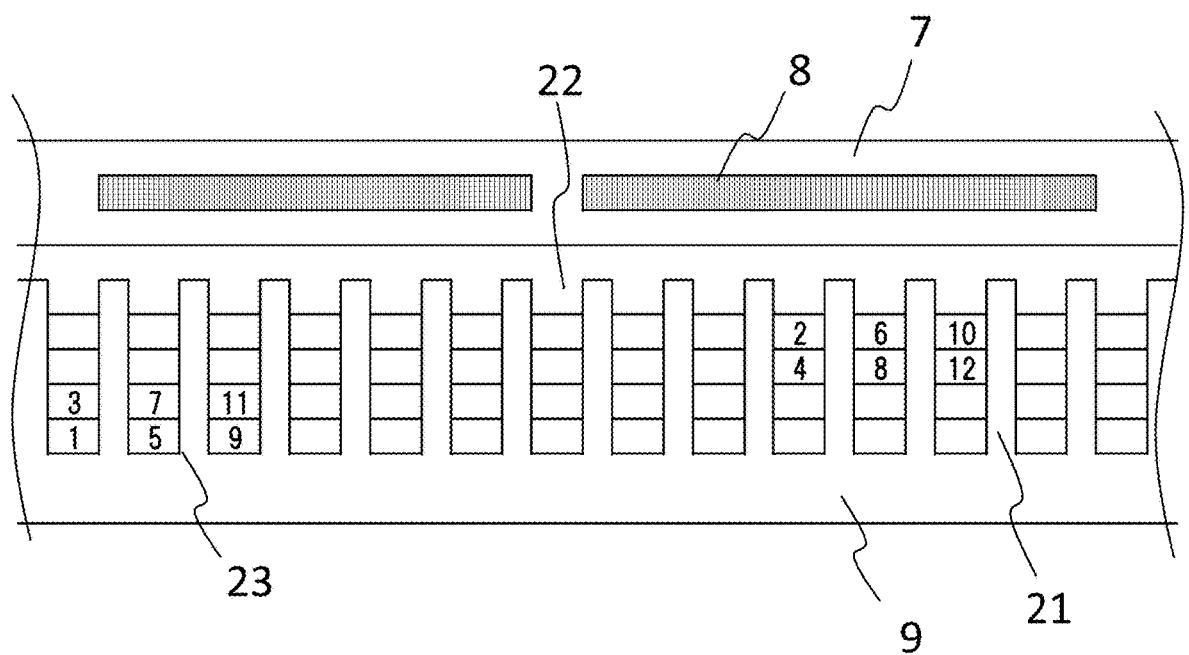
FIG. 13A is a diagram for explaining a connection configuration between coils according to a fourth embodiment.
Figure 13B:
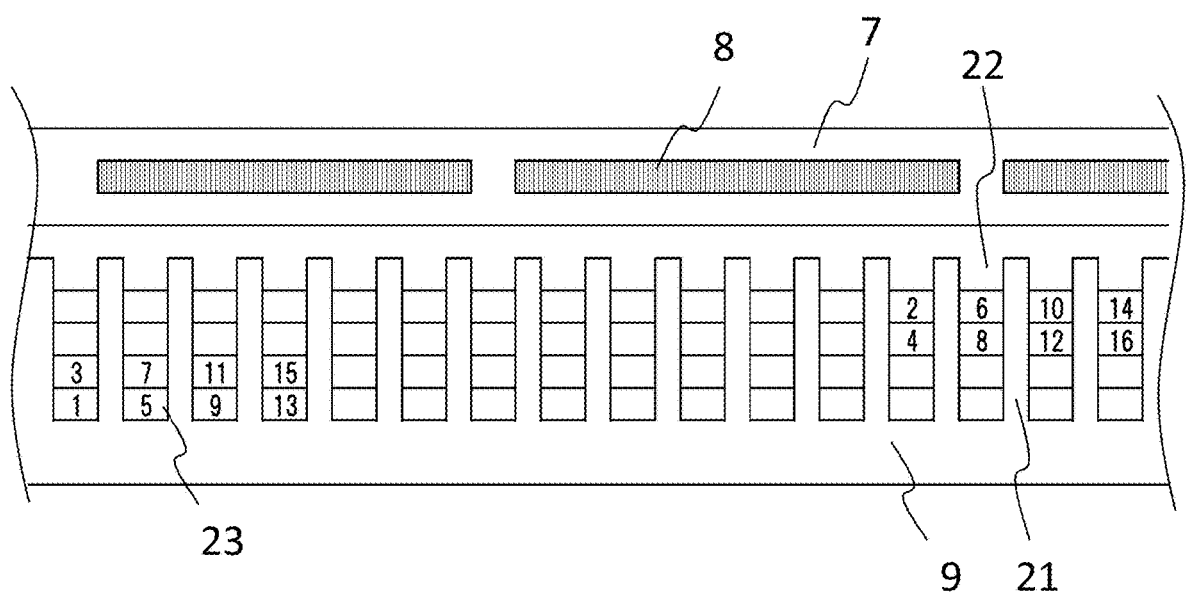
FIG. 13B is a diagram for explaining a connection configuration between coils according to the fourth embodiment.

In the present fourth embodiment, the following configurations will be described: a configuration in which the stator windings 10 for the respective phases are disposed in three slots per pole and per phase, as shown in FIG. 13A; and a configuration in which the stator windings 10 for the respective phases are disposed in four slots per pole and per phase, as shown in FIG. 13B.

In FIG. 13A and FIG. 13B, as in the upper side of FIG. 4, teeth 21 and slots 22 formed so as to be curved in the circumferential direction at a portion of the stator core 9 observed from above in the axial direction are linearly drawn.

The numbers written in the quadrangles in slots 22 in FIG. 13A and FIG. 13B indicate the order of winding of insertion portions 23, of a coil 12, disposed in the slots 22 of the stator core 9. In FIG. 13A, the insertion portions 23 are disposed so as to share three slots 22 with the adjacent coil 12. In FIG. 13B, the insertion portions 23 are disposed so as to share four slots 22 with the adjacent coil 12.

Figure 14A:
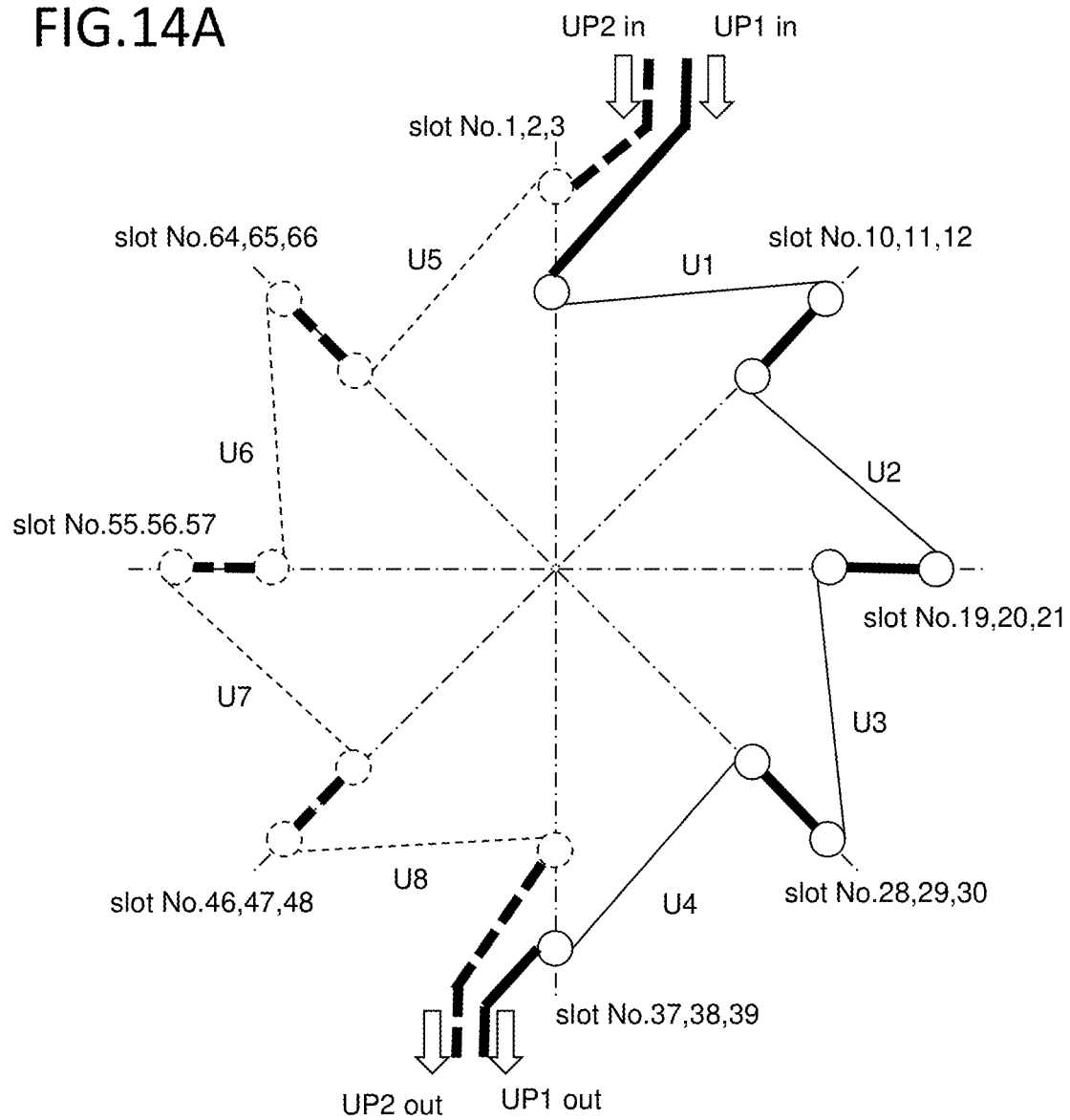
FIG. 14A illustrates arrangement of the coils on the stator core according to the fourth embodiment.

In the case where the stator windings 10 for the respective phases are disposed in three slots per pole and per phase and the number of the magnetic poles is set to eight, the number of the slots 22 of the stator core 9 is 72 and each phase is composed of eight coils 12, as shown in FIG. 14A. In addition, as in the first embodiment, each coil group 13 is composed of four coils 12. Therefore, as in the first embodiment and the like, each of the potential differences between the coils 12 can be reduced to ¼.

Figure 14B:
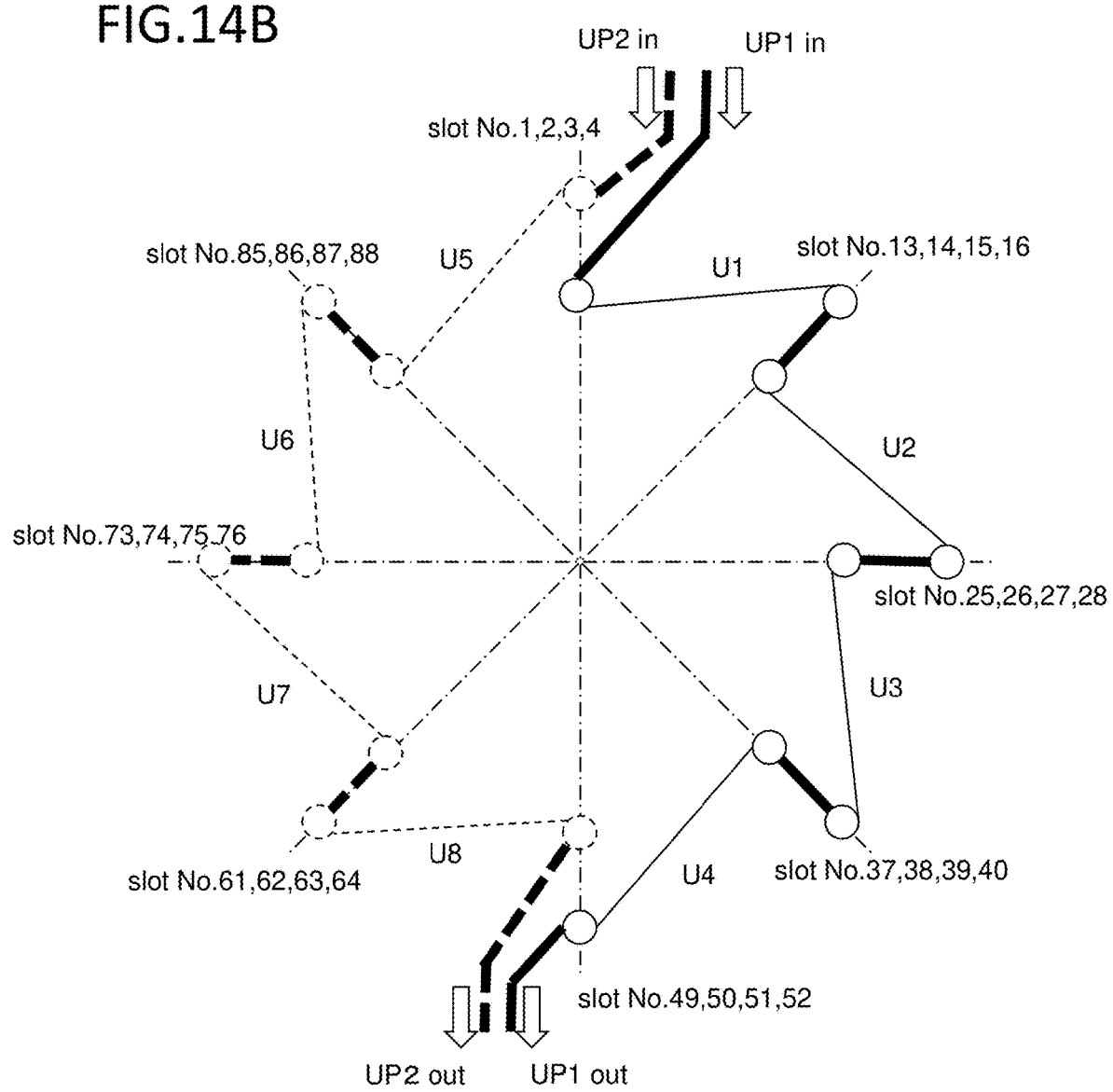
FIG. 14B illustrates arrangement of the coils on the stator core according to the fourth embodiment.

In the case where the stator windings 10 for the respective phases are disposed in four slots per pole and per phase and the number of the magnetic poles is set to eight, the number of the slots 22 of the stator core 9 is 96, as shown in FIG. 14B. In addition, as in the first embodiment, each phase is composed of eight coils 12, and each coil group 13 is composed of four coils 12. Therefore, as in the first embodiment and the like, each of the potential differences between the coils 12 can be reduced to ¼.

In the present fourth embodiment, three slots are formed per pole and per phase or four slots are formed per pole and per phase. That is, the number of the slots 22 of the stator core 9 is larger than those in the first embodiment and the like in which two slots are formed per pole and per phase. Thus, cogging torque can be reduced, whereby the effect of reducing vibrations of the rotary electric machine 100 can be obtained.

The present fourth embodiment is not limited to the configuration described herein in which two, three, or four slots are formed per pole and per phase. In a case where q (where "q" represents a natural number not less than 2) slots 22 are formed per pole and per phase in the stator core 9 and the windings for the respective phases are disposed in the q slots per pole and per phase, the same effect can be obtained.

In this case, one coil 12 can be obtained by using q unit coils 14, and thus n coils 12 can be obtained by using q*n unit coils 14. As in the first embodiment, the two coil groups 13 each formed by the n/2 coils 12 are connected in parallel to each other between the power feed portions and the neutral points, and each of the potential differences between the coils 12 can be reduced to 1/(n/2)=2/n of the in-phase potential difference.

In the present fourth embodiment, as in the first embodiment, the coils 12 adjacent to the power feed portions to which the two coil groups 13 are connected are disposed so as to share the slots 22, and the coils 12 adjacent to each other in each coil group 13 are also connected so as to share the slots 22.

Here, the example in which the two coil groups 13 each composed of the n/2 coils 12 are formed with use of the q*n unit coils 14 and the n coils 12, has been described. However, also in the case where, as described in the third embodiment, the four coil groups 13 each composed of the n/2 coils 12 are used with use of the 2*q*n unit coils 14 and the 2*n coils 12, the in-phase potential difference can be reduced to 2/n if the q slots are formed per pole and per phase.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 housing
2 bracket
3 stator
4 bearing
5 rotor
6 rotation shaft
7 rotor core
8 permanent magnet
9 stator core
10 stator winding
12 coil
13 coil group
14 unit coil
21 tooth
22 slot
23 insertion portion
24 turned portion
25 outer circumferential-side terminal
26 inner circumferential-side terminal
27 outer circumferential-side terminal
28 inner circumferential-side terminal
29 coil A
30 coil B
100 rotary electric machine

What is claimed is:
1. A rotary electric machine comprising:
an annular stator core in which, out of slots arrayed in a circumferential direction and extending in a radial direction, q ("q" represents a natural number not less than 2) slots are formed per pole and per phase; and stator windings, for respective phases, attached to the stator core, wherein for the stator windings, in each phase, q*n ("n" represents an even number not less than 4) unit coils obtained by winding wire conductors at regular intervals into concentric winding forms are used to obtain n coils in each of which the q unit coils wound in a same direction are connected so as to be shifted from each other in the circumferential direction, and the stator winding is composed of two coil groups each obtained by joining the n/2 coils together, the coils composing the coil groups are arrayed so as to circle the slots of the annular stator core, and the coils adjacent to each other in the circumferential direction are joined together so as to share the slots, and the two coil groups are connected in parallel to each other between power feed portions and neutral points, and two coils that are connected to the power feed portions among the coils composing the two coil groups are disposed so as to share the slot.

2. The rotary electric machine according to claim 1, wherein the coils adjacent to each other are disposed so as to share the same slots, and insertion portions formed by the wire conductors which form two of the coils adjacent to each other, are alternately arranged in the slot.

3. A rotary electric machine comprising:

an annular stator core in which, out of slots arrayed in a circumferential direction and extending in a radial direction, q ("q" represents a natural number not less than 2) slots are formed per pole and per phase; and stator windings, for respective phases, attached to the stator core, wherein for each stator winding, 2*q*n ("n" represents an even number not less than 4) unit coils obtained by winding wire conductors at regular intervals into concentric winding forms are used to obtain 2*n coils in each of which the q unit coils wound in a same direction are connected so as to be shifted from each other in the circumferential direction, and the stator winding is composed of four coil groups each obtained by joining the n/2 coils together, the coils composing the coil groups are arrayed so as to circle the slots of the annular stator core, and the coils adjacent to each other in the circumferential direction are joined together so as to share the slots, and the four coil groups are connected in parallel to each other between power feed portions and neutral points, and, among two of the coil groups respectively connected to two of the power feed portions, two coils that are connected to the power feed portions are disposed so as to share the slot.

4. The rotary electric machine according to claim 3, wherein the coils adjacent to each other are disposed so as to share the same slots, and insertion portions formed by the wire conductors which form two of the coils adjacent to each other, are alternately arranged in the slot.

* * * * *